United States Patent
Zhang et al.

(10) Patent No.: US 12,397,692 B2
(45) Date of Patent: Aug. 26, 2025

(54) PUMP VALVE MODULE AND METHOD FOR OPERATING THE SAME, SOLENOID VALVE-BASED PUMP VALVE MODULE FOR PROVIDING MASSAGE FUNCTION FOR VEHICLE SEAT, AND VEHICLE SEAT

(71) Applicant: AEW TECHNOLOGY GROUP CO., LTD., Hebei (CN)

(72) Inventors: Haitao Zhang, Hebei (CN); Kai Ma, Hebei (CN)

(73) Assignee: AEW TECHNOLOGY GROUP CO., LTD., Langfang (CN)

( * ) Notice: Subject to any disclaimer, the term of this patent is extended or adjusted under 35 U.S.C. 154(b) by 1091 days.

(21) Appl. No.: 17/296,545

(22) PCT Filed: Aug. 25, 2020

(86) PCT No.: PCT/CN2020/111131
§ 371 (c)(1),
(2) Date: May 24, 2021

(87) PCT Pub. No.: WO2021/093405
PCT Pub. Date: May 20, 2021

(65) Prior Publication Data
US 2022/0055513 A1    Feb. 24, 2022

(30) Foreign Application Priority Data

Nov. 13, 2019 (CN) .......................... 201911107091.8
Apr. 30, 2020 (CN) .......................... 202010364943.8
Apr. 30, 2020 (CN) .......................... 202020707199.2

(51) Int. Cl.
F16K 11/24    (2006.01)
B60N 2/90     (2018.01)
F16K 27/00    (2006.01)

(52) U.S. Cl.
CPC .............. *B60N 2/976* (2018.02); *F16K 11/24* (2013.01); *F16K 27/003* (2013.01)

(58) Field of Classification Search
CPC ........ B60N 2/976; F16K 11/24; F16K 27/003
See application file for complete search history.

(56) References Cited

U.S. PATENT DOCUMENTS 3,942,553 A * 3/1976 Gallatin .................. F16K 11/24
                                                   251/124
4,253,493 A * 3/1981 English ................. F16K 31/082
                                                   137/625.5

(Continued)

FOREIGN PATENT DOCUMENTS

CN    105443832 A    3/2016
CN    205478213 U    8/2016

(Continued)

OTHER PUBLICATIONS

English translation of CN1089536833 (Year: 2017).*

(Continued)

*Primary Examiner* — Craig M Schneider
*Assistant Examiner* — Christopher D Ballman

(57) ABSTRACT

A pump valve module and operating method, a solenoid valve-based pump valve module for providing a massage function for a vehicle seat, and a vehicle seat are disclosed. A composite solenoid valve in the pump valve module includes deflation solenoid valve and inflation solenoid valve connected in series and formed integrally by injection molding. A first part region of the inflation solenoid valve is connected to air source. A second part region of the deflation solenoid valve is connected to inflated bag. A second part region of the inflation solenoid valve is connected to a first part region of the deflation solenoid valve. Inflation is implemented when the inflation solenoid valve is powered on and the deflation solenoid valve is de-energized. Defla- (Continued)

tion is implemented through a third part region of the deflation solenoid valve when the inflation solenoid valve is de-energized and the deflation solenoid valve is powered on.

10 Claims, 13 Drawing Sheets

(56) References Cited

U.S. PATENT DOCUMENTS

| | | | | |
|---|---|---|---|---|
| 4,840,425 | A * | 6/1989 | Noble | A61G 7/05776 297/DIG. 3 |
| 4,860,792 | A * | 8/1989 | Ichihashi | F15B 13/044 137/637.1 |
| 5,241,292 | A * | 8/1993 | Bjorknas | H01F 7/1607 335/238 |
| 5,291,915 | A * | 3/1994 | Lukasczyk | G05D 16/2097 137/269 |
| 5,605,173 | A * | 2/1997 | Arnaud | F16K 11/24 137/7 |
| 6,032,667 | A * | 3/2000 | Heinonen | A61M 16/1015 128/204.19 |
| 6,561,221 | B1 * | 5/2003 | Kurz | F15B 13/0402 137/596.17 |
| 6,880,422 | B2 * | 4/2005 | Yamamoto | F16H 61/32 74/471 XY |
| 7,059,209 | B2 * | 6/2006 | Yamamoto | F16H 61/32 74/473.23 |
| 7,967,028 | B2 * | 6/2011 | Jinno | F16K 27/003 137/884 |
| 8,579,250 | B1 * | 11/2013 | Theobald | F16K 31/0613 251/129.09 |
| 8,794,707 | B2 * | 8/2014 | Bocsanyi | B60N 2/665 297/284.6 |
| 9,645,585 | B2 * | 5/2017 | Nguyen | G05D 7/0652 |
| 10,006,558 | B2 * | 6/2018 | Suematsu | F16K 31/402 |
| 10,024,453 | B2 * | 7/2018 | Robertson | F16K 11/24 |
| 10,060,546 | B2 * | 8/2018 | Tuskes | F16K 11/044 |
| 10,258,535 | B2 * | 4/2019 | Lem | B60N 2/976 |
| 10,859,175 | B2 * | 12/2020 | Tanaka | F16K 31/12 |
| 2013/0328649 | A1 * | 12/2013 | Robertson | H01F 7/08 335/234 |

FOREIGN PATENT DOCUMENTS

| | | |
|---|---|---|
| CN | 206257023 U | 6/2017 |
| CN | 206409691 U | 8/2017 |
| CN | 206957901 U | 2/2018 |
| CN | 108583388 A | 9/2018 |
| CN | 108799522 A | 11/2018 |
| CN | 108953683 A | 12/2018 |
| CN | 109987008 A | 7/2019 |
| CN | 110030175 A | 7/2019 |
| CN | 209164045 U | 7/2019 |
| CN | 110145461 A | 8/2019 |
| CN | 209976974 A | 1/2020 |
| CN | 110822133 A | 2/2020 |
| CN | 210290878 U | 4/2020 |
| CN | 210343897 U | 4/2020 |
| CN | 211599626 U | 9/2020 |
| DE | 10 2011 102 700 A | 11/2012 |
| DE | 202015000540 U1 | 4/2015 |
| EP | 3 037 703 B1 | 7/2017 |
| JP | 3193880 U | 10/2014 |
| WO | 99/48731 A1 | 9/1999 |
| WO | 2012/159689 A1 | 11/2012 |

OTHER PUBLICATIONS

First Office Action received for Chinese Patent Application Serial No. 202010364943.8 dated Apr. 8, 2021, 15 pages (Including English Translation).
International Search Report and Written Opinion received for PCT Application Serial No. PCT/CN2020/111131 dated Dec. 2, 2020, 12 pages (Including English Translation).
Notification of Grant received for Chinese Patent Application Serial No. 202020707199.2 dated Nov. 30, 2020, 2 pages (Including English Translation).
Chinese Application No. CN201911107091.8 First Search Report with English Translation.
German Application No. DE1120200000106.7 First Office Action dated Apr. 27, 2023 with English Translation.
International Preliminary Report on Patentability for International Application No. PCT/CN2020/111131 mailed May 17, 2022, 6 pages.

* cited by examiner

PUMP VALVE MODULE AND METHOD FOR OPERATING THE SAME, SOLENOID VALVE-BASED PUMP VALVE MODULE FOR PROVIDING MASSAGE FUNCTION FOR VEHICLE SEAT, AND VEHICLE SEAT

CROSS-REFERENCE TO RELATED APPLICATIONS

The present disclosure claims priority to Chinese Patent Application No. 201911107091.8, filed with the Chinese Patent Office on Nov. 13, 2019, entitled "Composite Solenoid Valve, Pump Valve Module, and Vehicle Seat", Chinese Patent Application No. 202010364943.8, filed with the Chinese Patent Office on Apr. 30, 2020, entitled "Solenoid Valve-based Pump Valve Module for Providing Massage Function for Vehicle Seat, and Vehicle Seat", and Chinese Patent Application No. 202020707199.2, filed with the Chinese Patent Office on Apr. 30, 2020, entitled "Solenoid Valve-based Pump Valve Module for Providing Massage Function for Vehicle Seat, and Vehicle Seat", which are incorporated herein by reference in their entireties.

TECHNICAL FIELD

The present disclosure relates to the field of composite solenoid valves, and in particular to a pump valve module and a method for operating the same, a solenoid valve-based pump valve module for providing a massage function for a vehicle seat, and a vehicle seat.

BACKGROUND ART

In the prior art systems such as pneumatic support, pneumatic massage, and pneumatic adjustment systems for a seat, when multiple inflatable bags are simultaneously connected to one air source, these inflatable bags should be deflated and inflated simultaneously. Therefore, in the use of the seat, one air source is often shared by one or two inflatable bags with the same function. In the case of multiple inflatable bags, a solenoid valve cannot individually control the inflation, deflation, and pressure maintenance of a single inflatable bag, but can only control the inflatable bags simultaneously. Its operation is not flexible and cannot achieve the effects required by humans. If the multiple inflatable bags are individually equipped with and controlled by corresponding pumps and solenoid valves, high cost is required, and a large space is occupied, thus such arrangement is not suitable for small space.

SUMMARY

In view of the above-mentioned disadvantages or drawbacks in the prior art, the present disclosure provides a composite solenoid valve-based pump valve module for a vehicle seat, so as to achieve at least one of the technical effects of differently controlling multiple inflatable bags with one air source.

The present disclosure provides a pump valve module, comprising an air pump and a composite solenoid valve. Each air outlet of the air pump is equipped with one composite solenoid valve.

The composite solenoid valve includes a deflation solenoid valve and an inflation solenoid valve connected in series and formed integrally by injection molding. A first part region of the inflation solenoid valve is connected to an air outlet of an air source. A second part region of the deflation solenoid valve is connected to an inflated bag. A second part region of the inflation solenoid valve is connected to a first part region of the deflation solenoid valve. Inflation is implemented when the inflation solenoid valve is powered on and the deflation solenoid valve is de-energized. The deflation is implemented through a third part region of the deflation solenoid valve when the inflation solenoid valve is de-energized and the deflation solenoid valve is powered on.

The first part region of the inflation solenoid valve communicates with the air outlet of the air pump. At least one composite solenoid valve is provided and is integrated and mounted in a housing formed integrally with the air pump.

Optionally, the second part region of the inflation solenoid valve is located at a structural connecting portion in the middle of the composite solenoid valve and is connected to and staggered axially with respect to the first part region of the deflation solenoid valve, and they are connected by an injection-molded core. A three-way port is provided in the injection-molded core. The three-way port has an end connected to the second part region of the inflation solenoid valve, an end connected to the first part region of the deflation solenoid valve, and the other end sealed by a sealing ball.

Optionally, the inflation solenoid valve is a two-position two-way solenoid valve or a two-position three-way solenoid valve, and the deflation solenoid valve is a two-position three-way solenoid valve.

Optionally, an air inlet nozzle is mounted in the first part region of the inflation solenoid valve, and the air inlet nozzle is connected to a side wall of the injection-molded core via a U-shaped iron.

Optionally, an air outlet nozzle is mounted in the third part region of the deflation solenoid valve, and a side wall of the air outlet nozzle is connected to a side wall of the injection-molded core via a U-shaped iron.

Optionally, a metal valve core of the inflation solenoid valve and/or the deflation solenoid valve is of one of a flat type and a spline type.

Optionally, the pump valve module further includes a pressure sensor. The pressure sensor is mounted in an air path of the pump valve module or mounted inside the composite solenoid valve.

The present disclosure provides an operating method based on a pump valve module, comprising the following working states:

a first working condition, where the inflation solenoid valve is powered on, the deflation solenoid valve is de-energized, the inflation solenoid valve is energized, and a metal valve core is moved down, so that a gas enters the inflation solenoid valve from the air source through a connecting channel, enters the first part region of the deflation solenoid valve from the second part region of the inflation solenoid valve through a channel in an injection-molded core, and enters the inflated bag from the second part region of the deflation solenoid valve;

a second working condition, where the inflation solenoid valve is de-energized, the deflation solenoid valve is powered on, the deflation solenoid valve is energized, a metal valve core is moved upward, and the connecting channel is closed, so that the gas enters the deflation solenoid valve from the inflated bag and is discharged from the third part region of the deflation solenoid valve through the second part region of the deflation solenoid valve;

a third working condition, where the inflation solenoid valve is de-energized, the deflation solenoid valve is de-energized, and the deflation solenoid valve is closed and configured to maintain air pressure in the inflated bag.

The present disclosure provides a vehicle seat, comprising a lumbar support and/or side wing supporting structure having an air source supplied by a pump valve module.

In summary, the present disclosure includes at least the following advantageous effects:

One or more such composite solenoid valves may be arranged in parallel and mounted on the upper part of an air pump to form a pump valve module together with the air pump. When the inflation solenoid valve of the composite solenoid valve is powered on and the deflation solenoid valve is de-energized, the inflation solenoid valve is energized and the valve core moves down to achieve inflation. When the inflation solenoid valve is de-energized and the deflation solenoid valve is powered on, the deflation solenoid valve is energized and the valve core moves upward to achieve deflation. Air pressure in the inflatable bag is maintained when the inflation solenoid valve is de-energized and the deflation solenoid valve is de-energized. The above-mentioned pump valve module enables different control of multiple inflatable bags with one air source, and an air pressure maintaining function is added to the inflatable bags. Moreover, the entire air source delivery and control device is configured as an integrated pump valve module, which has a compact structure, can be easily mounted, has stable functions, and enables the cooperation of multiple units with multiple functions.

An embodiment of the present disclosure provides a solenoid valve-based pump valve module for providing a massage function for a vehicle seat, which includes an air distribution layer and further includes a solenoid valve hermetically connected to an air outlet of the air distribution layer. The solenoid valve includes a valve body. A solenoid coil is provided around a side wall of the valve body. The valve body is provided with an air distribution chamber, and the two ends of the air distribution chamber act as an air inlet and an air discharge port, respectively. The side wall of the valve body is provided with a branched air passage communicating with the air distribution chamber and facing the same side as the air discharge port. The air discharge port is equipped with an air discharging member in which an air passage is provided, and a valve core built in the air distribution chamber is provided under the air discharging member. A first elastic element is sleeved on both the air discharging member and the valve core. The presence or absence of a gap between the air discharging member and the valve core can be adjusted by switching the solenoid coil to an energized or de-energized state.

For the solenoid valve-based pump valve module for providing a massage function for a vehicle seat according to the present disclosure, it is possible to adjust whether the air discharging member and the valve core are attracted to each other by adjusting whether the solenoid coil is in an energized state, and finally it is possible to adjust whether there is a gap between the air discharging member and the valve core by switching the solenoid coil to the energized or de-energized state. When the solenoid coil is switched to the energized state, there is no gap between the air discharging member and the valve core, and there is a gas flow in the inflation passageway. When the solenoid coil is switched to the de-energized state, there is a gap between the air discharging member and the valve core, and there is a gas flow in the deflation passageway. The working state of the inflatable bag can be adaptively switched from the inflated state to the deflated state by switching the state of the inflation passageway to the state of the deflation passageway. The branched air passage is on the same side as the air discharge port, so that the inflation end and the deflation end are located on the same side, whereby the overall structure of the solenoid valve can be reduced. In this way, the size of the solenoid valve-based pump valve module is further reduced, and the technical difficulty in further reducing the size of the solenoid valve-based pump valve module is solved.

Optionally, the air distribution layer is provided with at least three air outlets. At least three solenoid valves are provided and are hermetically connected to the air outlets in one-to-one correspondence.

Optionally, the branched air passage includes: an air introducing passage communicating with the air distribution chamber and an air injection passage communicating with a side wall of the air introducing passage. A sealing member is configured in a free end of the air introducing passage.

The structure of the branched air passage is improved to avoid the influence of the machining technology and facilitate the machining of the air introducing passage. A through hole is provided at an end of the air introducing passage farther away from the solenoid valve to facilitate provision of a gas channel in the air introducing passage. A sealing member is configured in the free end of the air introducing passage, so that the air introducing passage can be easily sealed after the machining is finished.

Optionally, an accommodating cavity is provided annularly in an outer wall of the valve body, and the solenoid coil is wound in the accommodating cavity.

Optionally, a first stop groove and a second stop groove are provided annularly in the outer wall of the air discharging member and in the outer wall of the valve core, respectively. The two ends of the first elastic element are locked in the first stop groove and the second stop groove, respectively.

The two ends of the first elastic element are respectively locked in the first stop groove and the second stop groove by fixing the first elastic element in the stop grooves.

Optionally, the pump valve module further includes a first U-shaped iron longitudinally straddling the outer wall of the valve body. The first U-shaped iron is provided with through holes allowing the air inlet and the free end of the air discharging member to be exposed.

Optionally, at least one air outlet of the air distribution layer is equipped with a composite solenoid valve. The composite solenoid valve includes a deflation solenoid valve and an inflation solenoid valve connected in series and formed integrally by injection molding. A first part region of the inflation solenoid valve is connected to an air outlet of an air source. A second part region of the deflation solenoid valve is connected to an inflated bag. A second part region of the inflation solenoid valve is connected to a first part region of the deflation solenoid valve. Inflation is implemented when the inflation solenoid valve is powered on and the deflation solenoid valve is de-energized. The deflation is implemented through a third part region of the deflation solenoid valve when the inflation solenoid valve is de-energized and the deflation solenoid valve is powered on.

At least one air outlet of the air distribution layer is equipped with a composite solenoid valve. When the inflation solenoid valve of the composite solenoid valve is powered on and the deflation solenoid valve is de-energized, the inflation solenoid valve is energized and the valve core moves down to achieve inflation. When the inflation solenoid valve is de-energized and the deflation solenoid valve is powered on, the deflation solenoid valve is energized and the valve core moves upward to achieve deflation. Air pressure in the inflatable bag is maintained when the inflation solenoid valve is de-energized and the deflation solenoid valve is de-energized. The above-mentioned composite solenoid valve enables different control of multiple inflatable bags with one air source, and an air pressure maintaining function is added to the inflatable bags.

Optionally, the air distribution layer is further provided with a pressure regulating protrusion, and a pressure regulating groove is provided in the pressure regulating protrusion. A pressure regulating hole communicating with the air distribution layer is provided in the bottom of the pressure regulating groove. An overflow valve is configured in the pressure regulating protrusion.

Optionally, the overflow valve includes: an overflow column with a bottom extending into the pressure regulating hole, a limit ring provided around an outer wall of the overflow column, a second elastic element sleeved on a side wall of the overflow column and located above the limit ring, and a top cover sleeved on the top of the overflow column and provided with a through slot in its center. A second sealing ring is sleeved on the side wall of the overflow column under the limit ring.

In the structure of this module, a pressure regulating protrusion communicating with the inside of the air distribution layer is provided in the middle of the air distribution layer, and an overflow valve with a pressure stabilizing function is configured in the pressure regulating protrusion, in order to ensure a stable gas pressure in the air distribution layer. When the air pressure in the air distribution layer is greater than a safety threshold, the gas overflows from the overflow valve so that the air pressure is restored to the safety threshold or lower.

An embodiment of the present disclosure provides a solenoid valve-based pump valve module for providing a massage function for a vehicle seat, which includes an air distribution layer and further includes a solenoid valve hermetically connected to an air outlet of the air distribution layer. The solenoid valve includes a valve body. A solenoid coil is provided around a side wall of the valve body. The valve body is provided with an air distribution chamber, and the two ends of the air distribution chamber act as an air inlet and an air discharge port, respectively. The side wall of the valve body is provided with a branched air passage communicating with the air distribution chamber and facing the same side as the air discharge port. The air discharge port is equipped with an air discharging member in which an air passage is provided, and a valve core built in the air distribution chamber is provided under the air discharging member. A first elastic element is sleeved on both the air discharging member and the valve core. The presence or absence of a gap between the air discharging member and the valve core can be adjusted by switching the solenoid coil to an energized or de-energized state. At least one air outlet of the air distribution layer is equipped with an air path communicating therewith, and the air path has a sealable free end.

Optionally, the air distribution layer is provided with at least four air outlets. At least three of the air outlets are hermetically connected to the solenoid valves in one-to-one correspondence. One of the air outlets is equipped with an air path communicating therewith, and a free end of the air path is provided with a sealing cover.

In the specific structure of the above-mentioned module in an embodiment of the present disclosure, an air path connected to at least one air outlet of the air distribution layer and communicating therewith is also designed to be reserved for inflating other components. On the other hand, the design of the structure of the solenoid valve is optimized so that the inflation end and the deflation end are located on the same side, whereby the overall structure of the solenoid valve can be reduced, and hence the size of the solenoid valve-based pump valve module is further reduced.

In this technical solution, it is possible to adjust whether the air discharging member and the valve core are attracted to each other by adjusting whether the solenoid coil is in an energized state, and finally it is possible to adjust whether there is a gap between the air discharging member and the valve core by switching the solenoid coil to the energized or de-energized state. When the solenoid coil is switched to the energized state, there is no gap between the air discharging member and the valve core, and there is a gas flow in the inflation passageway. When the solenoid coil is switched to the de-energized state, there is a gap between the air discharging member and the valve core, and there is a gas flow in the deflation passageway. The working state of the inflatable bag can be adaptively switched from the inflated state to the deflated state by switching the state of the inflation passageway to the state of the deflation passageway. The branched air passage is on the same side as the air discharge port, so that the inflation end and the deflation end are located on the same side.

Based on the above-mentioned basic design, the structure of the solenoid valve is further optimized in this technical solution. For example, the structure of the branched air passage is further optimized, and the influence of the machining technology is taken into consideration in order to facilitate the machining of the air introducing passage. A through hole is provided at an end of the air introducing passage farther away from the solenoid valve to facilitate provision of a gas channel in the air introducing passage. A sealing member is configured in the free end of the air introducing passage, so that the air introducing passage can be easily sealed after the machining is finished. For another example, the two ends of the first elastic element are respectively locked in the first stop groove and the second stop groove, in order to easily fix the first elastic element.

In this technical solution, the structure of the air distribution layer of the solenoid valve-based pump valve module is further optimized. In other words, in the structure of this module, a pressure regulating protrusion communicating with the inside of the air distribution layer is provided in the middle of the air distribution layer, and an overflow valve with a pressure stabilizing function is configured in the pressure regulating protrusion, in order to ensure a stable gas pressure in the air distribution layer. When the air pressure in the air distribution layer is greater than a safety threshold, the gas overflows from the overflow valve so that the air pressure is restored to the safety threshold or lower. In addition, the specific structure of the overflow valve is also disclosed in this embodiment.

In this technical solution, the structure of the air distribution layer of the solenoid valve-based pump valve module is further optimized. At least one air outlet of the air distribution layer is equipped with a composite solenoid valve. Based on this design, in this embodiment, when the inflation solenoid valve of the composite solenoid valve is powered on and the deflation solenoid valve is de-energized, the inflation solenoid valve is energized and the valve core moves down to achieve inflation. When the inflation solenoid valve is de-energized and the deflation solenoid valve is powered on, the deflation solenoid valve is energized and the valve core moves upward to achieve deflation. Air pressure in the inflatable bag is maintained when the inflation solenoid valve is de-energized and the deflation solenoid valve is de-energized. The above-mentioned composite solenoid valve enables different control of multiple inflatable bags with one air source, and an air pressure maintaining function is added to the inflatable bags.

The present disclosure provides a vehicle seat, comprising: a solenoid valve-based pump valve module for providing a massage function for a vehicle seat.

The solenoid valve-based pump valve module for providing a massage function for a vehicle seat according to this technical solution is applicable to a vehicle seat, so that the vehicle seat has a more compact internal space structure so as to form an optimized structural layout.

BRIEF DESCRIPTION OF THE DRAWINGS

Other features, objects, and advantages of the present disclosure will become more apparent by reading the detailed description of non-limiting embodiments with reference to the following drawings.

Figure 1:
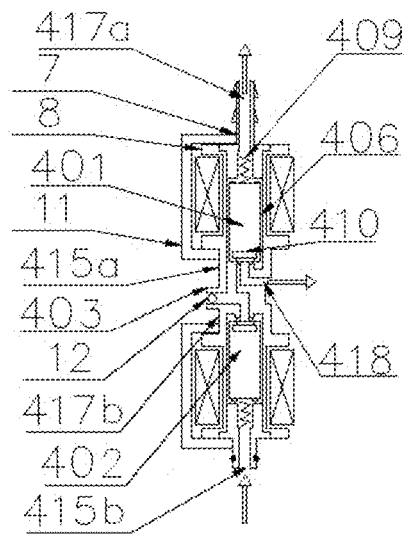
FIG. 1 is a schematic structural diagram of a composite solenoid valve in a pressure maintaining state in the present disclosure.

Reference Numerals in the Figures: 4—air pump; 5—pressure sensor; 7—air nozzle; 8—frame; 11—U-shaped iron; 12—sealing ball; 13—upper shell; 14—PCB board; 10—solenoid valve; 101—valve body; 110—accommodating cavity; 111—first U-shaped iron; 102—solenoid coil; 103—air distribution chamber; 104—branched air passage; 1041—air introducing passage; 1042—air injection passage; 105—air passage; 106—air discharging member; 1061—first stop groove; 1071—second stop groove; 107—valve core; 1072—sealing groove; 108—first elastic element; 109—sealing member; 20—solenoid valve-based pump valve module for providing a massage function for a vehicle seat; 21—pressure regulating protrusion; 211—pressure regulating groove; 212—pressure regulating hole; 22—overflow valve; 221—overflow column; 222—limit ring; 223—second elastic element; 224—top cover; 225—second sealing ring; 23—air distribution layer; 30—inflatable bag; 40—composite solenoid valve; 401—deflation solenoid valve; 402—inflation solenoid valve; 403—injection-molded core; 406—metal valve core; 409—spring; 410—silicone cap; 411—second U-shaped iron; 415a—first part region of a deflation solenoid valve 401; 415b—first part region of a inflation solenoid valve 402; 416—connecting channel; 417a—second part region of the deflation solenoid valve 401; 417b—second part region of the inflation solenoid valve 402; 418—third part region.

DETAILED DESCRIPTION OF THE EMBODIMENTS

The present disclosure will be described in further detail below with reference to the accompanying drawings and embodiments. It will be understood that specific embodiments described here are only intended to explain a relevant invention, but not intended to limit the invention. In addition, it should be noted that only the parts related to the invention are shown in the drawings for ease of description.

It should be noted that the embodiments in the present disclosure and the features in the embodiments can be combined with each other without conflict. The present disclosure will be described below in detail with reference to the accompanying drawings and in connection with embodiments.

Referring to FIG. 1, a composite solenoid valve according to this embodiment includes a deflation solenoid valve 401 and an inflation solenoid valve 402 connected in series and formed integrally by injection molding. A first part region 415b of the inflation solenoid valve 402 is connected to an air outlet of an air source. A second part region 417a of the deflation solenoid valve 401 is connected to an inflated bag or a bag to be inflated. A second part region 417b of the inflation solenoid valve 402 is connected to a first part region 415a of the deflation solenoid valve 401. Inflation is implemented when the inflation solenoid valve 402 is powered on and the deflation solenoid valve 401 is de-energized. The deflation is implemented through a third part region 418 of the deflation solenoid valve 401 when the inflation solenoid valve 402 is de-energized and the deflation solenoid valve 401 is powered on. The composite solenoid valve is placed at the top end of the air source and may constitute one structural body together with the air source. Here, the inflation solenoid valve 402 is a two-position two-way solenoid valve. The second part region 417b of the inflation solenoid valve 402 is configured to allow air to be fed into the deflation solenoid valve 401. The first part region 415b of the inflation solenoid valve 402 is configured to allow air to be fed from the air source. The deflation solenoid valve 401 is a two-position three-way solenoid valve. The second part region 417a of the deflation solenoid valve 401 is configured to inflate the inflated bag. The third part region 418 of the deflation solenoid valve 401 is configured to release the air. The first part region 415a of the solenoid valve 401 is configured to receive the gas from the inflation solenoid valve 402. The composite solenoid valve is placed at the top end of the air source to form one structural body so as to achieve an integrated compact structural arrangement.

Here, the first part region 415a of the deflation solenoid valve 401 acts as the air inlet of the deflation solenoid valve 401, the second part region 417a of the deflation solenoid valve 401 acts as the air outlet of the deflation solenoid valve 401, and the third part region of the deflation solenoid valve 401 418 acts as the deflation port of the deflation solenoid valve 401. The first part region 415b of the inflation solenoid valve 402 acts as the air inlet of the inflation solenoid valve 402. The second part region 417b of the inflation solenoid valve 402 acts as the air outlet of the inflation solenoid valve 402. Here, the type of the air source may be selected from an air pump, an air source carried in the body of a vehicle, or other components that can be used as the air source.

The second part region 417b of the inflation solenoid valve 402 is located at a structural connecting portion in the middle of the composite solenoid valve and is connected to and staggered axially with respect to the first part region 415a of the deflation solenoid valve 401, and they are connected by an injection-molded core 403. A three-way port is provided in the injection-molded core 403. The three-way port has an end connected to the second part region 417b of the inflation solenoid valve 402, an end connected to the first part region 415a of the deflation solenoid valve 401, and the other end sealed by a sealing ball 12. Here, the second part region 417b of the inflation solenoid valve 402 is staggered axially with respect to the deflation solenoid valve 401, thus they can only be connected in a bridged manner by an injection-molded core 3 provided with a three-way port. An unnecessary air hole generated by the bridging is blocked by a sealing ball 12 mounted therein by interference fit.

Figure 6:
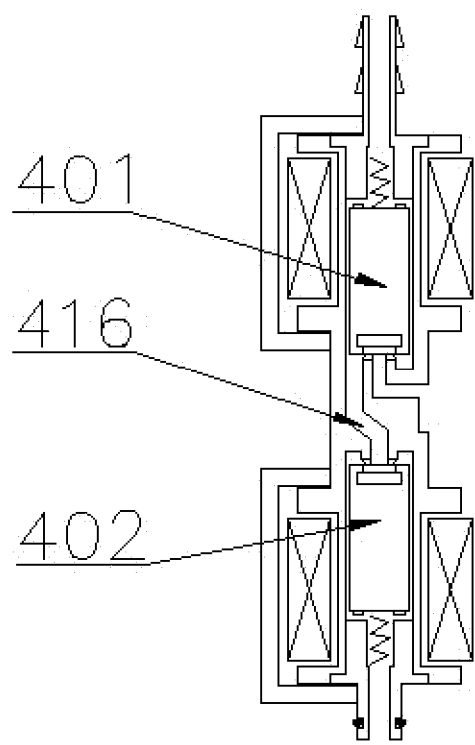
FIG. 6 is a schematic structural diagram of a composite solenoid valve with a connecting channel in the present disclosure.

As shown in FIG. 6, here, the second part region 417b of the inflation solenoid valve 402 and the first part region 415a of the deflation solenoid valve 401 may be connected by a connecting channel 416 instead of being connected by the three-way port, so that the second part region 417b of the inflation solenoid valve 402 communicates directly with the first part region 415a of the deflation solenoid valve 401. In this way, the effect of simplifying the structure can be achieved. In other embodiments, the inflation solenoid valve 402 and the deflation solenoid valve 401 may be connected by other connecting components.

An air inlet nozzle is mounted in the first part region 415b of the inflation solenoid valve 402, and the air inlet nozzle is connected to the side wall of the injection-molded core 403 via a U-shaped iron 11. An air outlet nozzle is mounted in the third part region 418 of the deflation solenoid valve 401, and the side wall of the air outlet nozzle is connected to the side wall of the injection-molded core 403 via the U-shaped iron 11. Here, the air inlet nozzle of the inflation solenoid valve 402 is configured to be connected to the air outlet of the air source, and the air outlet nozzle of the inflation solenoid valve 402 is configured to be connected to the inflated bag. The U-shaped iron 11 not only connects the air outlet nozzle and the air inlet nozzle to a frame 8 of the composite solenoid valve, but also has the effect of increasing the magnetic field.

Figure 5:
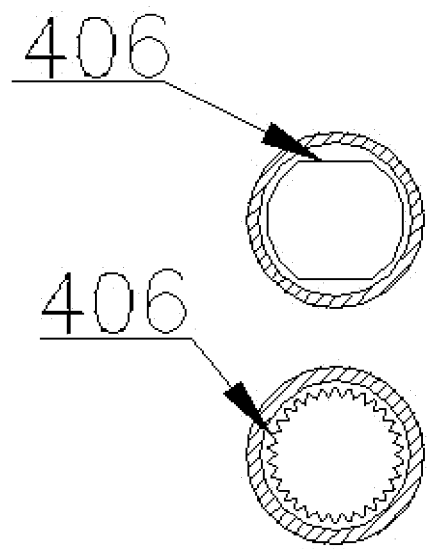
FIG. 5 is a sectional view of a metal valve core of a composite solenoid valve in the present disclosure.

As shown in FIG. 5, the metal valve core 406 of the inflation solenoid valve 402 and/or the deflation solenoid valve 401 is of one of a flat type and a spline type. There is a gap between the flat or spline-type metal valve core 406 and the housing of the solenoid valve. The gap serves as an air path channel between the first part region and the second part region of the solenoid valve.

As shown in FIG. 1, the cavity of the inflation solenoid valve 402 has a lower end acting as the first part region 415b, and an upper end acting as the second part region 417b. A silicone cap 410, a metal valve core 406, and a spring 409 are arranged in this order from top to bottom in the cavity. When the inflation solenoid valve 402 is powered on, the silicone cap 410 moves down along with the metal valve core 406. The first part region 415b is equipped with an air inlet nozzle. The air inlet nozzle is connected to the side wall of the injection-molded core 403 via the U-shaped iron 11. The air inlet nozzle is connected to the inflation solenoid valve 402 and then connected to the air outlet of the air source to achieve the inflation function. An airflow flows through the deflation solenoid valve 401 and then into the inflated bag, thereby achieving the inflation function. The cavity of the deflation solenoid valve 401 with the same structure as the inflation solenoid valve 402 has a lower left end acting as the first part region 415a, a lower right end acting as the third part region 418, and an upper end acting as the second part region 417a. A silicone cap 410, a metal valve core 406, and a spring 409 are arranged in this order from bottom to top in the cavity. The third part region 418 is equipped with an air outlet nozzle. The side wall of the air outlet nozzle is connected to the side wall of the injection-molded core 403 via the U-shaped iron 11. When the deflation solenoid valve 401 is powered on, the metal valve core 406 of the deflation solenoid valve 401 moves upward, the second part region 417*a* is communicated with the third part region 418, and the gas in the inflated bag enters from the second part region 417*a* and then is discharged from the third part region 418 to achieve the deflation.

Therefore, in the technical solution of this embodiment, not only the inflation and deflation are achieved by one composite solenoid valve, but also the pressure maintaining function can be achieved when both the inflation solenoid valve 402 and the deflation solenoid valve 401 are closed. Moreover, an upper shell 13 is further provided outside the composite solenoid valve to serve as a protector for the composite solenoid valve. Further, this structure is integrated on a PCB board 14 to further improve the integration of the device and simplify the structure and installation.

Figure 3:
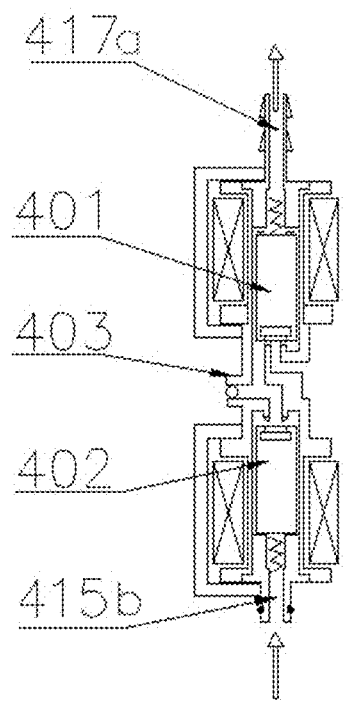
FIG. 3 is a schematic structural diagram of a composite solenoid valve in an air feeding state according to an embodiment of the present disclosure.

The specific working steps are performed as follows:

In this technical solution, a two-position two-way solenoid valve or a two-position three-way solenoid valve is designed as the inflation solenoid valve, and a two-position three-way solenoid valve is designed as the deflation solenoid valve. The two solenoid valves form a solenoid valve module with three working states:

1. As shown in FIG. 3, the inflation solenoid valve 402 is powered on, and the deflation solenoid valve 401 is de-energized. The inflation solenoid valve 402 is energized and the metal valve core 406 moves down, so that the gas enters the inflation solenoid valve 402 from the air source through the first part region 415*b* of the inflation solenoid valve 402, then enters the first part region 415*a* of the deflation solenoid valve 401 from the second part region 417*b* of the inflation solenoid valve 402 through a channel in the injection-molded core 403, and finally enters the inflated bag from the second part region 417*a* of the deflation solenoid valve 401 to achieve the inflation.

Figure 4:
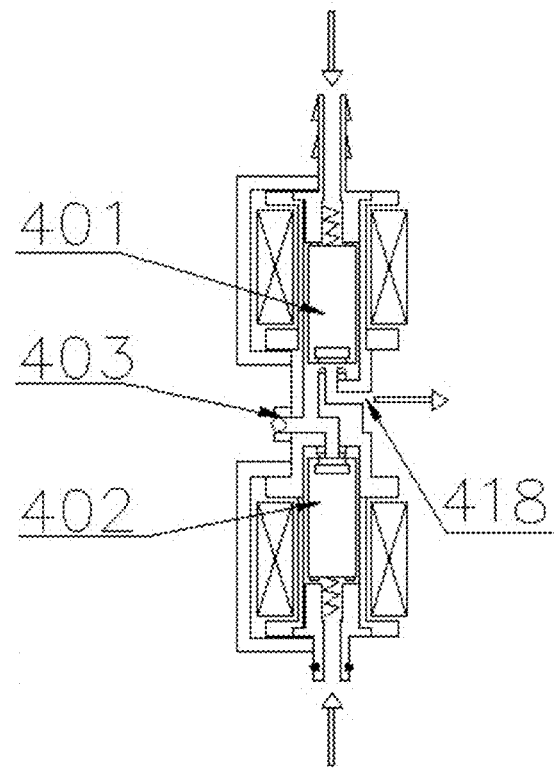
FIG. 4 is a schematic structural diagram of a composite solenoid valve in an air discharging state according to an embodiment of the present disclosure.

2. As shown in FIG. 4, the inflation solenoid valve 402 is de-energized, and the metal valve core 406 of the inflation solenoid valve 402 is pushed up by the spring 409 and moved back to its original position to close the second part region of the inflation solenoid valve 402 and to prohibit the passage of airflow. The deflation solenoid valve 401 is powered on. The deflation solenoid valve 401 is energized such that the metal valve core 406 moves upward. Since no gas passes through the second part region of the inflation solenoid valve 402, the gas enters the deflation solenoid valve 401 from the inflated bag and is then discharged from the third part region 418 of the deflation solenoid valve 401 through the second part region 417*a* of the deflation solenoid valve 401 to achieve the deflation.

3. As shown in FIG. 1, the inflation solenoid valve 402 is de-energized and the deflation solenoid valve 401 is de-energized. The gas cannot enter the deflation solenoid valve 401, so that the air pressure in the inflation bag is maintained.

Figure 2:
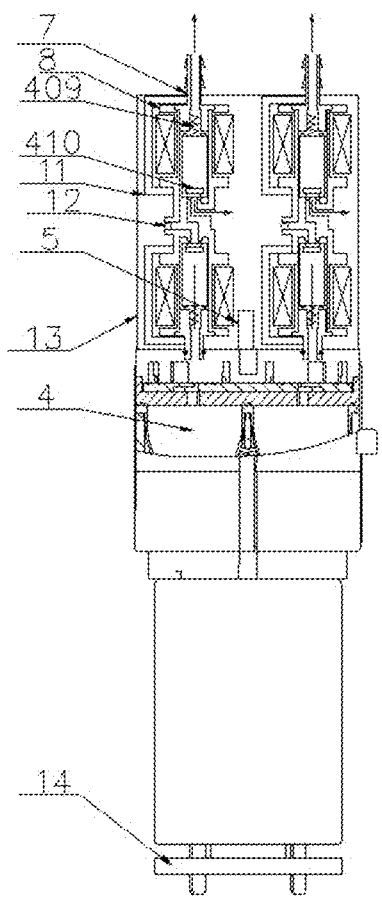
FIG. 2 is a schematic structural diagram of a pump valve module in the present disclosure.

As shown in FIG. 2, a pump valve module according to this embodiment includes an air pump 4. Each air outlet of the air pump 4 is equipped with one composite solenoid valve in the foregoing embodiment. The first part region 415*b* of the inflation solenoid valve 402 communicates with the air outlet of the air pump 4. Optionally, there are four composite solenoid valves, and the four composite solenoid valves are integrated and mounted in a housing formed integrally with the air pump 4. In other embodiments, any other number of composite solenoid valves may be provided as required.

Optionally, a pressure sensor 5 is mounted in an air path of the pump valve module. The pressure sensor 5 is mounted in the air path of the pump valve module or mounted inside the composite solenoid valve. The pressure sensor 5 monitors the air path system to achieve a more complex control. The pressure sensor 5 may be optionally mounted at a position in any of the following manners.

1. The pressure sensor 5 is mounted in an air path allowing air supply from the air pump to all the composite solenoid valves and is configured to detect the air pressure of air supplied from the air pump.

2. The pressure sensors 5 are mounted in air paths between the composite solenoid valves and the inflated bags. In this case, the number of the pressure sensors 5 is identical with the number of the composite solenoid valves, and they are configured to monitor the pressure in the inflated bags, respectively.

3. The pressure sensors 5 are mounted in both the air path allowing air supply from the air pump to all the composite solenoid valves and in the air paths between the composite solenoid valves and the inflated bags. In this case, the air pressure of each air path in the entire pump valve module can be comprehensively monitored.

This embodiment provides a vehicle seat. The vehicle seat includes a lumbar support and/or side wing supporting structure having an air source supplied by the pump valve module in the foregoing embodiment. The inflatable bag(s) of the lumbar support and/or side wing supporting structure of the vehicle seat is inflated or deflated by a composite solenoid valve. The vehicle seat in this embodiment enables different adjustment and control of multiple inflatable bags.

Figure 7:
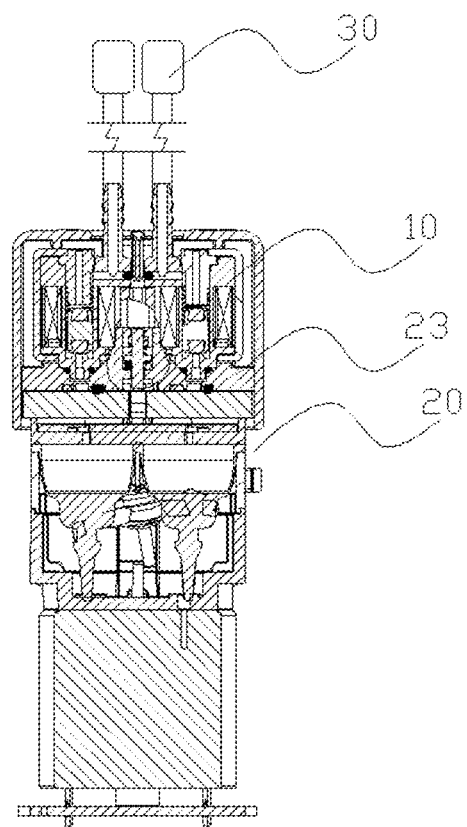
FIG. 7 is a schematic structural diagram of an embodiment of a solenoid valve-based pump valve module for providing a massage function for a vehicle seat according to the present disclosure.

Reference is made to FIG. 7, which is a schematic structural diagram of an embodiment of a solenoid valve-based pump valve module for providing a massage function for a vehicle seat according to an embodiment of the present disclosure. A solenoid valve-based pump valve module 20 for providing a massage function for a vehicle seat includes an air distribution layer 23 and further includes a solenoid valve 10 hermetically connected to the air outlet of the air distribution layer 23. The air distribution layer 23 is connected to the output end of the air pump in the module, communicates with each air outlet of the air pump at its end close to the air pump, and is provided with at least one air outlet at its end far away from the air pump.

It should be noted that the composite solenoid valve according to this embodiment has the same structure as the composite solenoid valve according to the foregoing embodiment.

Figure 9:
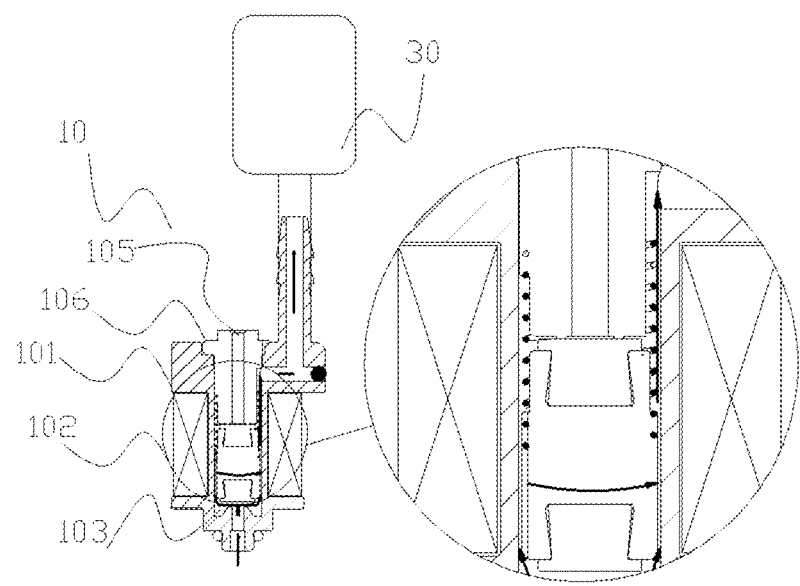
FIG. 9 is a schematic structural diagram of an embodiment of a solenoid valve in an air feeding state according to the present disclosure.

Reference is made to FIG. 9, which is a schematic structural diagram of an embodiment of a solenoid valve in an air feeding state according to the present disclosure. This figure shows an energized state of the solenoid valve, and arrows in the figure indicate a gas flow direction.

Figure 10:
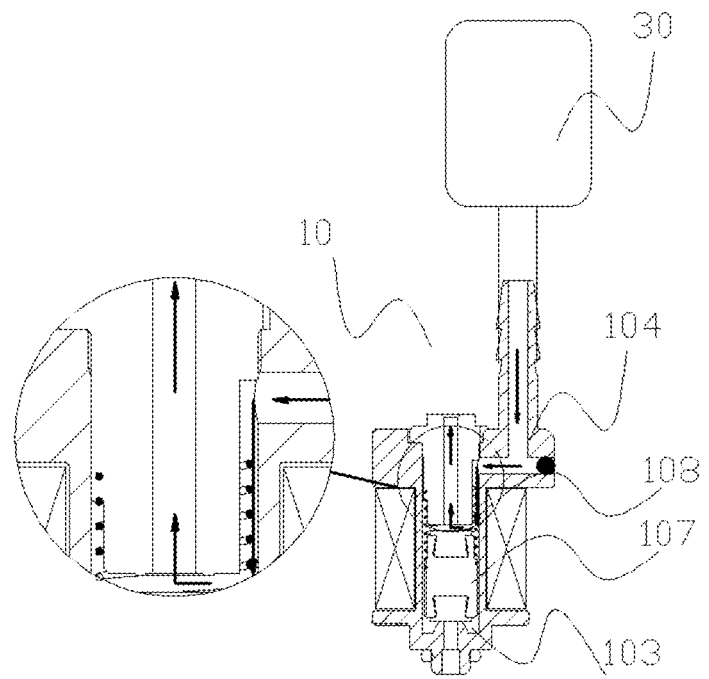
FIG. 10 is a schematic structural diagram of an embodiment of a solenoid valve in an air discharging state according to the present disclosure.

Reference is made to FIG. 10, which is a schematic structural diagram of an embodiment of a solenoid valve in an air discharging state according to the present disclosure. This figure shows a non-energized state of the solenoid valve, and arrows in the figure indicate a gas flow direction.

Figure 11:
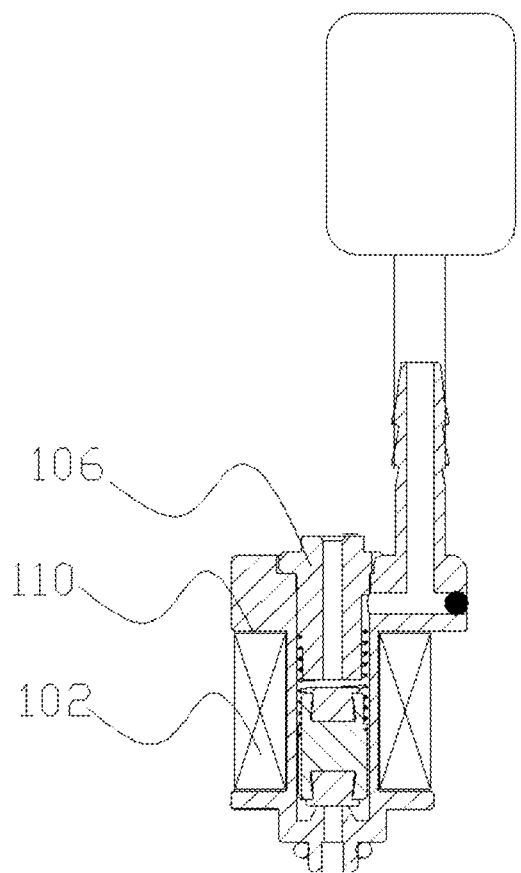
FIG. 11 is a schematic structural diagram of an embodiment of a solenoid valve of the present disclosure.

As shown in FIGS. 9 to 11, the solenoid valve 10 includes a valve body 101. A solenoid (or electromagnetic) coil 102 is provided around the side wall of the valve body 101. The valve body 101 is provided with an air distribution chamber 103, and the two ends of the air distribution chamber 103 act as an air inlet and an air discharge port, respectively. The side wall of the valve body is provided with a branched air passage 104 communicating with the air distribution chamber 103 and facing the same side as the air discharge port. The air discharge port is equipped with an air discharging member 106 in which an air passage 105 is provided, and a valve core 107 built in the air distribution chamber 103 is provided under the air discharging member 106. A first elastic element 108 is sleeved on both the air discharging member 106 and the valve core 107. The presence or absence of a gap between the air discharging member 106 and the valve core 107 can be adjusted by switching the solenoid coil 102 to an energized or de-energized state.

Here, the valve body 101 is a basic structure, which may specifically be formed integrally by injection molding. A solenoid coil 102 is provided around the side wall of the valve body. Optionally, reference is made to a schematic structural diagram of an embodiment of a solenoid valve shown in FIG. 11. An accommodating cavity 110 is provided annularly (or circumferentially) in the outer wall of the valve body 101, and the solenoid coil 102 is wound in the accommodating cavity 110. When the solenoid coil is energized, a magnetic field can be generated around the valve body to magnetize components to be magnetized, so that a corresponding action is generated between the magnetized components.

The air distribution chamber is provided inside the valve body and has two ends acting as an air inlet and an air discharge port, respectively. The air inlet is used for being connected to a gas supply structure. The branched air passage 104 is provided in the side wall of the valve body and communicates with the air distribution chamber. An inflatable bag 30 is connected to the free end of the branched air passage.

Based on the above-mentioned design, the air distribution chamber and the branched air passage 104 communicate with each other and can allow the gas to circulate therein. Components to be magnetized, namely, the air discharging member 106 mounted at the air discharge port and the valve core 107 provided in the air distribution chamber, are designed in the air distribution chamber in the valve body. The air discharging member 106 and the valve core are connected by a first elastic element 108. Optionally, the air discharging member 106 and the valve core 107 are made of iron.

Optionally, a rubber block is embedded in the center of the top of the valve core 107 and is used for sealing the bottom of the air discharging member 106 when the air discharging member 106 attracts the valve core 107. Optionally, a rubber cap is embedded in the center of the bottom of the valve core 107 and is used for sealing the inlet of the air distribution chamber when the valve core 107 is restored to the original position under the action of the first elastic element 108.

When the solenoid valve 10 is energized, a magnetic field is established in the valve body 101. The air discharging member 106 and the valve core 107 act as components to be magnetized. The air discharging member 106 and the valve core 107 are affected by the magnetic field generated by the solenoid coil and have opposite magnetic properties at their proximal ends, so that the fixedly arranged air discharging member 106 can attract the valve core 107, and there is no gap between the air discharging member 106 and the valve core 107. At this time, the first elastic element 108 is compressed, and the fixedly arranged air discharging member 106 can attract the valve core 107 so that the position of the valve core 107 is raised, and the air inlet is exposed. An inflation passageway is formed by the air inlet, the air distribution chamber, and the branched air passage 104. The solenoid valve 10 in this state can inflate the inflatable bag 30 through the inflation passageway.

When the solenoid valve 102 is in a non-energized state, the air discharging member 106 and the valve core 107 are freed from the magnetic field, and the valve core 106 will be moved in a direction away from the air discharging member 106 under the action of the first elastic element 108 until the valve core 107 is returned to the initial position in the air distribution chamber 103 to close the air inlet. In other words, there is a gap between the air discharging member 106 and the valve core 107, and a deflation passageway is formed by the branched air passage 104, the air distribution chamber 103, and the air passage.

In this embodiment, it is possible to adjust whether the air discharging member 106 and the valve core 107 are attracted to each other by adjusting whether the solenoid coil 102 is in an energized state, and finally it is possible to adjust whether there is a gap between the air discharging member 106 and the valve core 107 by switching the solenoid coil 102 to the energized or de-energized state. When the solenoid coil 102 is switched to the energized state, there is no gap between the air discharging member 106 and the valve core 107, and there is a gas flow in the inflation passageway. When the solenoid coil 102 is switched to the de-energized state, there is a gap between the air discharging member 106 and the valve core 107, and there is a gas flow in the deflation passageway. The working state of the inflatable bag 30 can be adaptively switched from the inflated state to the deflated state by switching the state of the inflation passageway to the state of the deflation passageway.

The branched air passage 104 is on the same side as the air discharge port, so that the inflation end and the deflation end can be located on the same side. In this way, the overall structural size of the solenoid valve can be significantly reduced, so that the overall structure of the solenoid valve-based pump valve module for providing a massage function for a vehicle seat can be further reduced.

Figure 13:
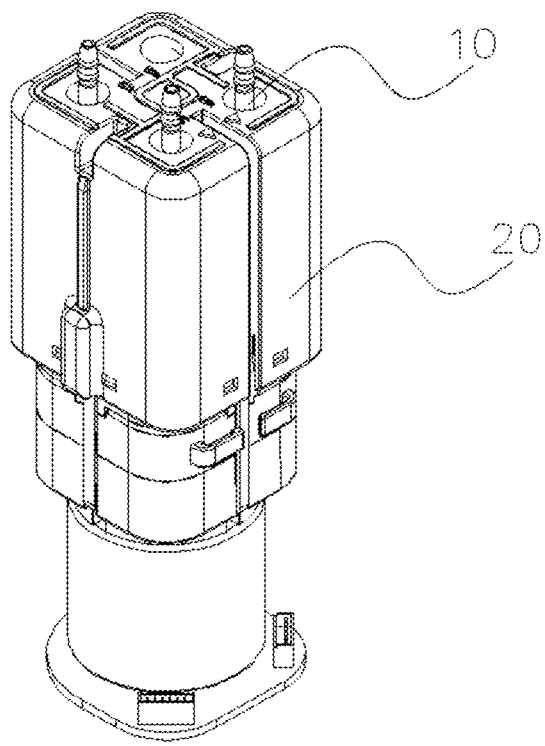
FIG. 13 is a schematic structural diagram of an embodiment of a solenoid valve-based pump valve module for providing a massage function for a vehicle seat according to the present disclosure.

Reference is made to a schematic structural diagram of an embodiment of a solenoid valve-based pump valve module for providing a massage function for a vehicle seat shown in FIG. 13. In this embodiment, the structure of the air distribution layer is specifically optimized in such a manner that the air distribution layer 23 is provided with at least three air outlets. At least three solenoid valves 10 are provided and are hermetically connected to the air outlets in one-to-one correspondence.

Figure 12:
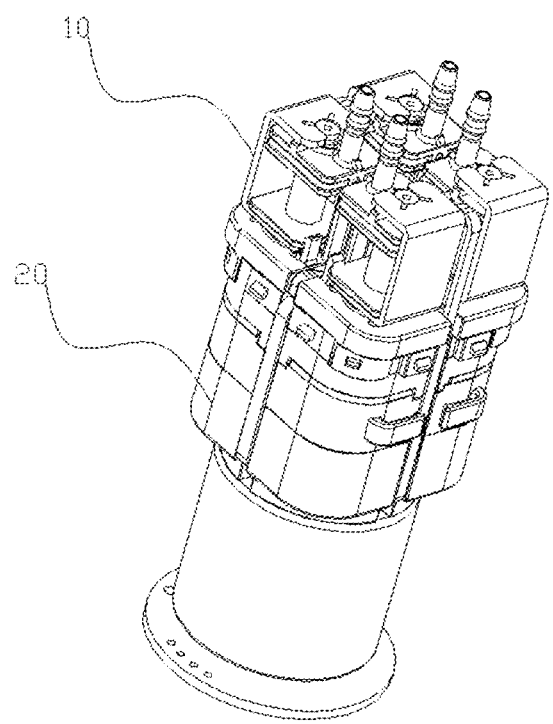
FIG. 12 is a schematic structural diagram of an embodiment of a solenoid valve-based pump valve module for providing a massage function for a vehicle seat according to the present disclosure.

Optionally, there are three air outlets in the air distribution layer, and there are three solenoid valves. Optionally, there are four air outlets in the air distribution layer, and there are four solenoid valves, referring to FIG. 12. Correspondingly, the number of the solenoid valves corresponds individually to the number of the air outlets of the air distribution layer.

Figure 15:
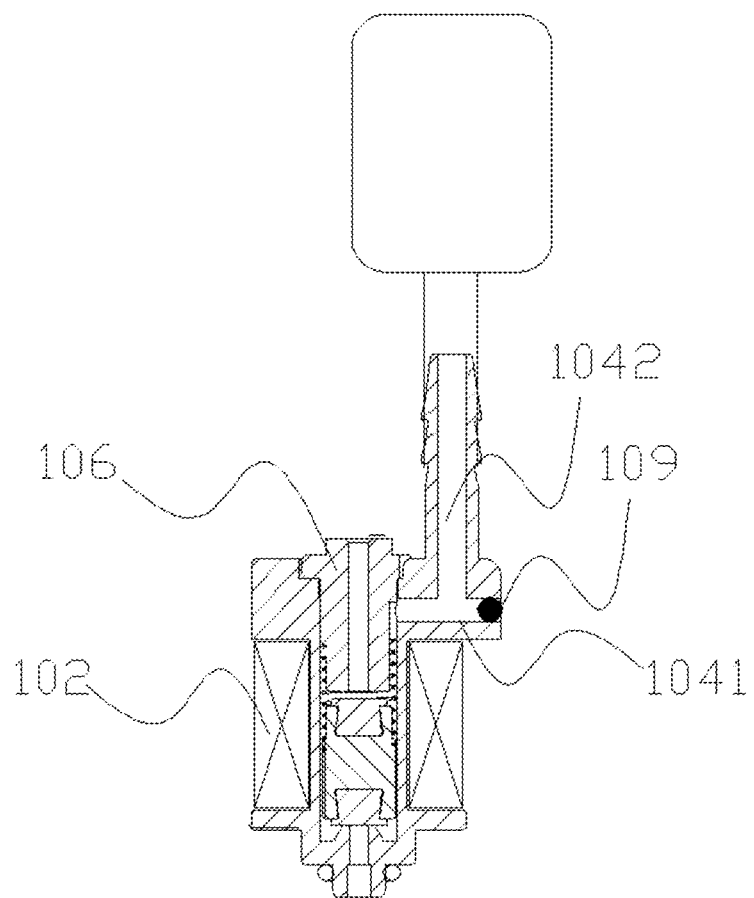
FIG. 15 is a schematic structural diagram of an embodiment of a solenoid valve in a de-energized state according to the present disclosure.

Reference is made to FIG. 15, which a schematic structural diagram of an embodiment of a solenoid valve in a de-energized state according to the present disclosure. The branched air passage 104 includes an air introducing passage 1041 communicating with the air distribution chamber 103 and an air injection passage 1042 communicating with the side wall of the air passage 1041. A sealing member 109 is configured in the free end of the air introducing passage 1041. In the operation of machining the air introducing passage, in order to facilitate machining of a cavity allowing the gas to flow therein, the free end of the air introducing passage is also in a through state so as to facilitate the machining of the internal cavity. When the machining is completed, a sealing member 109 is configured in the free end of the air introducing passage 1041 in order to close the free end of the air introducing passage. Optionally, the sealing member 109 has a spherical structure.

Figure 16:
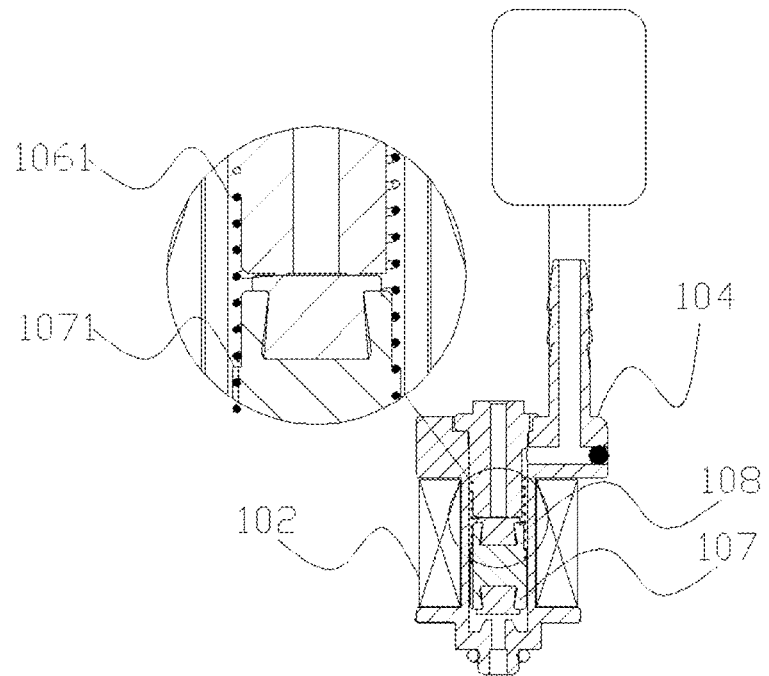
FIG. 16 is a schematic structural diagram of an embodiment of a solenoid valve in an energized state according to the present disclosure.

Reference is made to FIG. 16, which is a schematic structural diagram of an embodiment of a solenoid valve in an energized state according to the present disclosure. A first stop groove 1061 and a second stop groove 1071 are provided annularly in the outer wall of the air discharging member 106 and in the outer wall of the valve core 107, respectively. The two ends of the first elastic element 108 are locked in the first stop groove 1061 and the second stop groove 1071, respectively. The first stop groove 1061 and the second stop groove 1071 are designed such that the elastic element can be stably clamped therebetween, and detachment of the elastic element therefrom can be effectively prevented. Optionally, the first elastic element is a spring.

Figure 17:
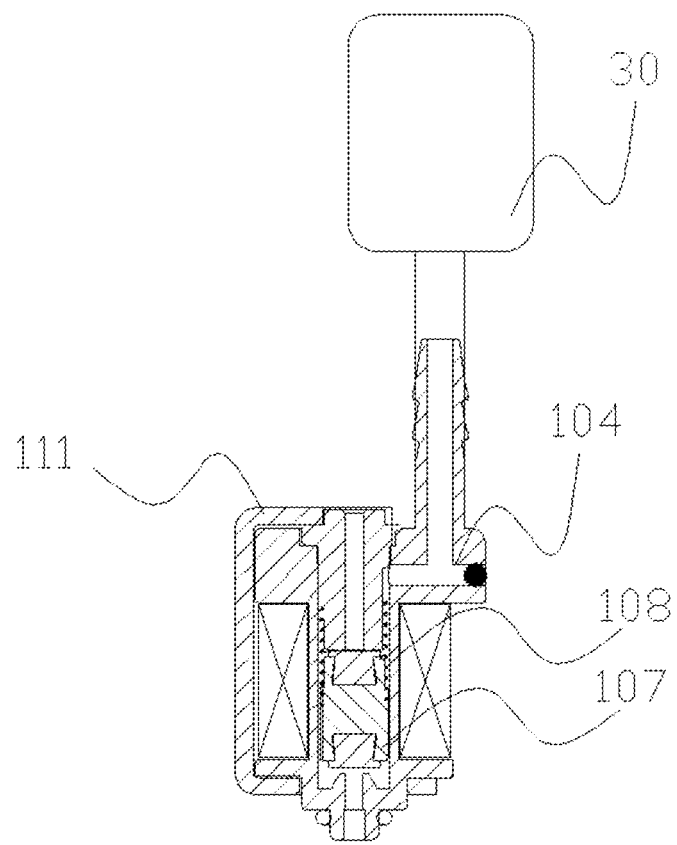
FIG. 17 is a schematic structural diagram of an embodiment of a solenoid valve of the present disclosure.

Reference is made to a schematic structural diagram of an embodiment of a solenoid valve shown in FIG. 17. The solenoid valve further includes a first U-shaped iron 111 longitudinally straddling the outer wall of the valve body 101. The first U-shaped iron 111 is provided with through holes allowing the air inlet and the free end of the air discharging member 106 to be exposed.

In this embodiment, the magnetic flux of the magnetic field formed by the solenoid coil can be increased to assist in the above-mentioned operation process. Specifically, the U-shaped iron straddles the side wall of the valve body in FIG. 17. In other words, it is horizontally arranged and its opening faces the valve body, and its two free ends are fixedly connected to the side wall of the valve body, respectively. The first U-shaped iron 111 is provided with through holes allowing the air inlet and the free end of the air discharging member 106 to be exposed, in order to facilitate the exposure of the air inlet and the air discharge port.

Figure 18:
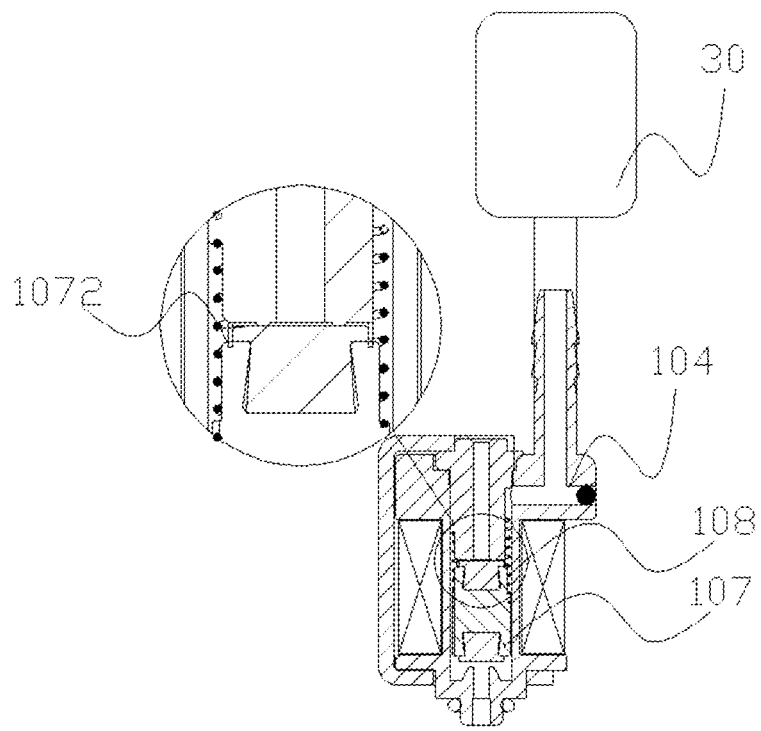
FIG. 18 is a schematic structural diagram of an embodiment of a solenoid valve of the present disclosure.

Reference is made to a schematic structural diagram of an embodiment of a solenoid valve shown in FIG. 18. A sealing groove 1072 is provided at one end of the valve core 107 closer to the air discharging member 106, and a first sealing ring is provided in the sealing groove 1072. When the solenoid valve can inflate the inflatable bag via the inflation passageway, the air discharging member 106 and the valve core 107 are affected by the magnetic field generated by the solenoid coil 102 and have opposite magnetic properties at their proximal ends, so that the fixed air discharging member 106 can attract the valve core 107. A first sealing ring is optionally designed in this embodiment, in order to prevent escape of the gas entering the air passage from the gap between the air discharging member and the valve core.

Figure 19:
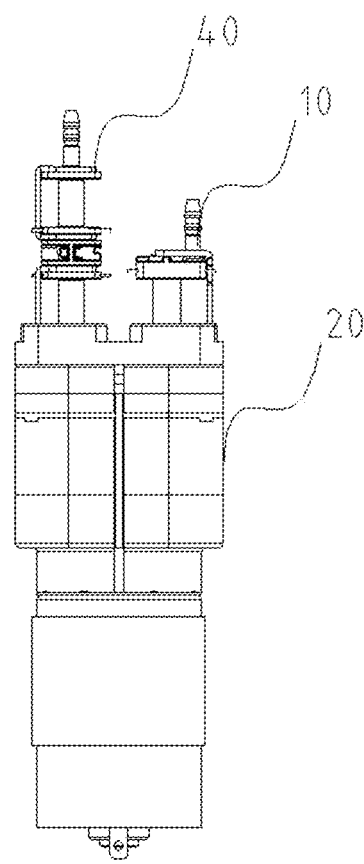
FIG. 19 is a schematic structural diagram of an embodiment of a solenoid valve-based pump valve module of the present disclosure.
Figure 20:
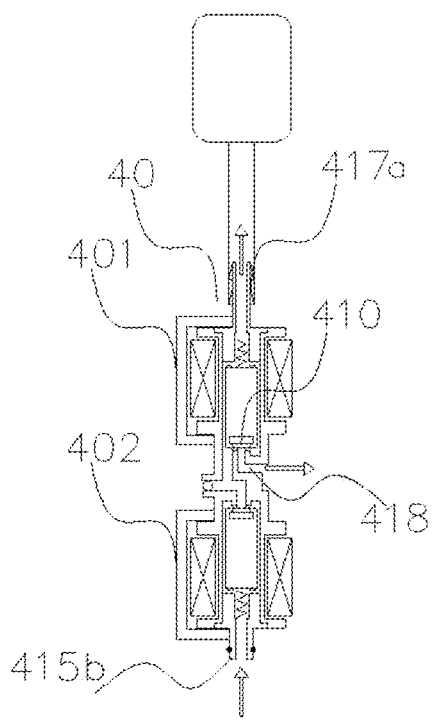
FIG. 20 is a schematic structural diagram of an embodiment of a composite solenoid valve in a pressure maintaining state according to the present disclosure.

Reference is made to a schematic structural diagram of an embodiment of a solenoid valve-based pump valve module shown in FIG. 19. FIG. 20 is a schematic structural diagram of an embodiment of a composite solenoid valve in a pressure maintaining state according to the present disclosure, wherein FIG. 20 shows the specific structure of the composite solenoid valve. At least one air outlet of the air distribution layer 23 is equipped with a composite solenoid valve 40. The composite solenoid valve 40 includes a deflation solenoid valve 401 and an inflation solenoid valve 402 connected in series and formed integrally by injection molding. A first part region 415b of the inflation solenoid valve 402 is connected to an air outlet of an air source. A second part region 417a of the deflation solenoid valve 401 is connected to an inflated bag or a bag to be inflated. A second part region 417b of the inflation solenoid valve 402 is connected to a first part region 415a of the deflation solenoid valve 401. Inflation is implemented when the inflation solenoid valve 402 is powered on and the deflation solenoid valve 401 is de-energized. The deflation is implemented through a third part region 418 of the deflation solenoid valve 401 when the inflation solenoid valve 402 is de-energized and the deflation solenoid valve 401 is powered on. The composite solenoid valve is placed at the top end of the air source and may constitute one structural body together with the air source. Here, the inflation solenoid valve 402 is a two-position two-way solenoid valve. The second part region 417b of the inflation solenoid valve 402 is used for allowing air to be fed into the deflation solenoid valve 401. The first part region 415b of the inflation solenoid valve 402 is used for allowing air to be fed from the air source. The deflation solenoid valve 401 is a two-position three-way solenoid valve. The second part region 417a of the deflation solenoid valve 401 is used for inflating the inflated bag. The third part region 418 of the deflation solenoid valve 401 is used for releasing the air. The first part region 415a of the solenoid valve 401 is used for receiving the gas from the inflation solenoid valve 402. The composite solenoid valve is placed at the top end of the air source to form one structural body so as to achieve an integrated compact structural arrangement.

As shown in FIG. 20, the cavity of the inflation solenoid valve 402 has a lower end acting as the first part region 415b, and an upper end acting as the second part region 417b. A silicone cap 410, a metal valve core 406, and a spring 409 are arranged in this order from top to bottom in the cavity. When the inflation solenoid valve 402 is powered on, the silicone cap 410 moves down along with the metal valve core 406. The first part region 415b is equipped with an air inlet nozzle. The air inlet nozzle is connected to the side wall of the injection-molded core 403 via a second U-shaped iron 411. The air inlet nozzle is connected to the inflation solenoid valve 402 and then connected to the air outlet of the air source to achieve the inflation function. An airflow flows through the deflation solenoid valve 401 and then into the inflated bag, thereby achieving the inflation function. Similarly to the structure of the inflation solenoid valve 402, the cavity of the deflation solenoid valve 401 has a lower left end acting as the first part region 415a, a lower right end acting as the third part region 418, and an upper end acting as the second part region 417a. A silicone cap 410, a metal valve core 406, and a spring 409 are arranged in this order from bottom to top in the cavity. The third part region 418 is equipped with an air outlet nozzle. The side wall of the air outlet nozzle is connected to the side wall of the injection-molded core 403 via the second U-shaped iron 411. When the deflation solenoid valve 401 is powered on, the metal valve core 406 of the deflation solenoid valve 401 moves upward, the second part region 417a is communicated with the third part region 418, and the gas in the inflated bag enters from the second part region 417a and then is discharged from the third part region 418 to achieve the deflation.

Therefore, in the technical solution of this embodiment, not only the inflation and deflation are achieved by one composite solenoid valve, but also the pressure maintaining function can be achieved when both the inflation solenoid valve 402 and the deflation solenoid valve 401 are closed. Moreover, an upper shell is further provided outside the composite solenoid valve to serve as a protector for the composite solenoid valve. Further, this structure is integrated on a PCB board to further improve the integration of the device and simplify the structure and installation.

Figure 21:
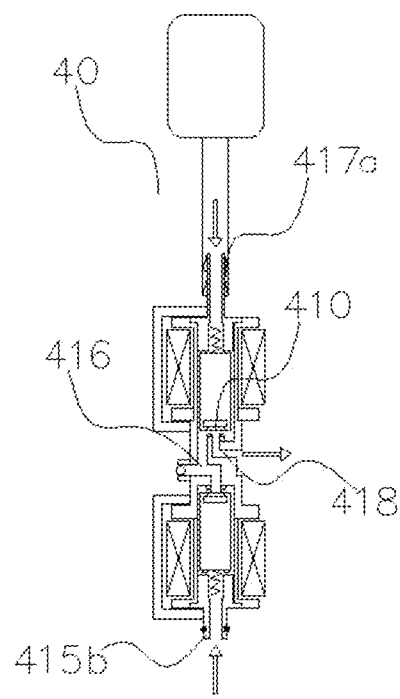
FIG. 21 is a schematic structural diagram of an embodiment of a composite solenoid valve in an air discharging state according to the present disclosure.
Figure 22:
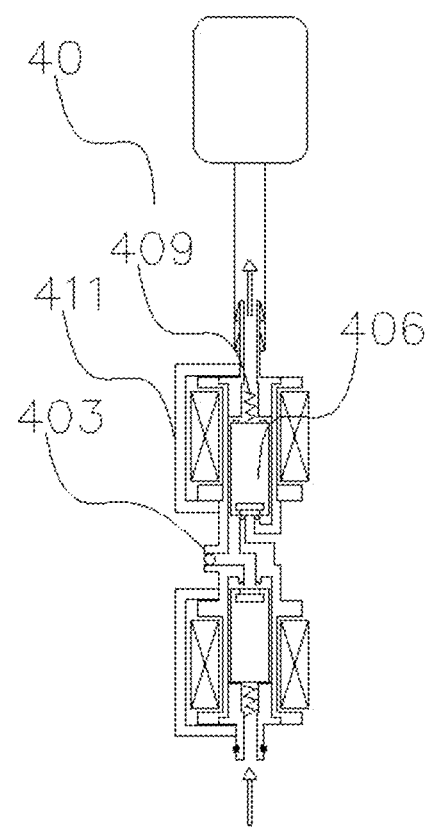
FIG. 22 is a schematic structural diagram of an embodiment of a composite solenoid valve in an air feeding state according to the present disclosure.

In this embodiment, a two-position two-way solenoid valve or a two-position three-way solenoid valve is designed as the inflation solenoid valve, and a two-position three-way solenoid valve is designed as the deflation solenoid valve. The two solenoid valves form a solenoid valve module with three working states:

1. As shown in FIG. 22, the inflation solenoid valve 402 is powered on, and the deflation solenoid valve 401 is de-energized. The inflation solenoid valve 402 is energized and the metal valve core 406 moves down, so that the gas enters the inflation solenoid valve 402 from the air source through the connecting channel 416, then enters the first part region 415*a* of the deflation solenoid valve 401 from the second part region 417*b* of the inflation solenoid valve 402 through a channel in the injection-molded core 403, and finally enters the inflated bag from the second part region 417*a* of the deflation solenoid valve 401 to achieve the inflation. 2. As shown in FIG. 21, the inflation solenoid valve 402 is de-energized, and the deflation solenoid valve 401 is powered on. The deflation solenoid valve 401 is energized such that the metal valve core 406 moves upward. No gas passes through the connecting channel 416. The gas enters the deflation solenoid valve 401 from the inflated bag and is then discharged from the third part region 418 of the deflation solenoid valve 401 through the second part region 417*a* of the deflation solenoid valve 401 to achieve the deflation.

3. As shown in FIG. 20, the inflation solenoid valve 402 is de-energized and the deflation solenoid valve 401 is de-energized. The gas cannot enter the deflation solenoid valve 401, so that the air pressure in the inflation bag is maintained.

Figure 23:
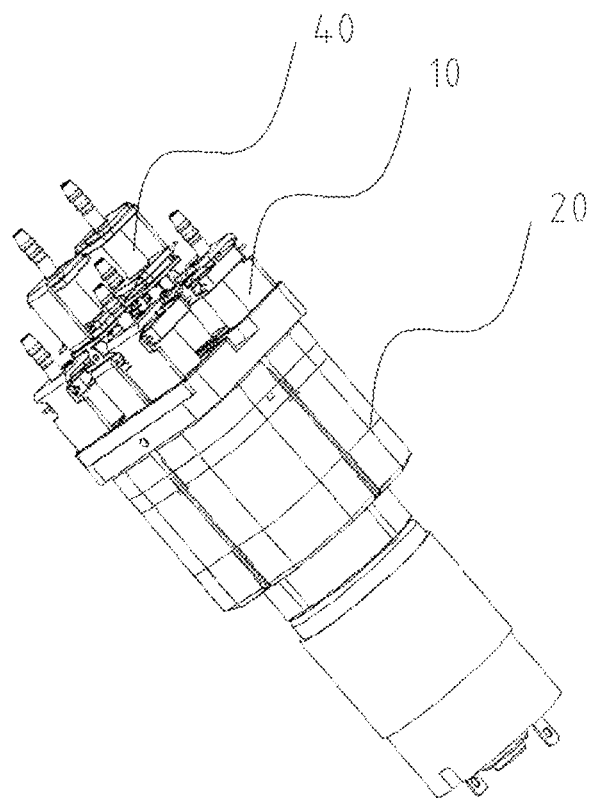
FIG. 23 is a schematic structural diagram of an embodiment of a solenoid valve-based pump valve module of the present disclosure.

Reference is made to FIG. 23, which is a schematic structural diagram of an embodiment of a solenoid valve-based pump valve module of the present disclosure, wherein there are four solenoid valves 10, and there are two composite solenoid valves.

Figure 24:
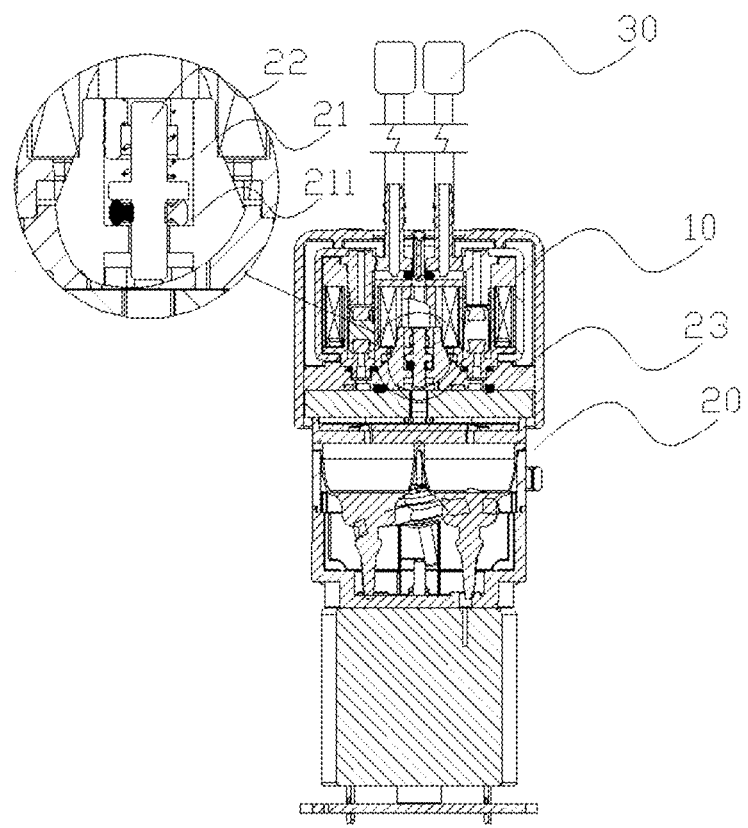
FIG. 24 is a schematic structural diagram of an embodiment of a solenoid valve-based pump valve module for providing a massage function for a vehicle seat according to the present disclosure.
Figure 25:
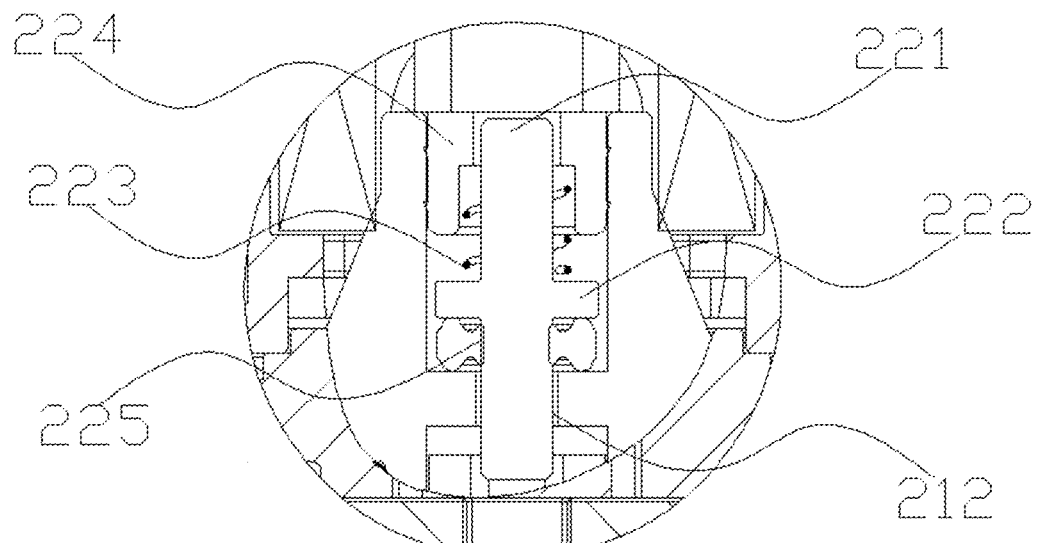
FIG. 25 is a schematic partially enlarged structural diagram of an overflow valve of FIG. 21 in the present disclosure.

Reference is made to schematic structural diagrams of an embodiment of a solenoid valve-based pump valve module for providing a massage function for a vehicle seat shown in FIGS. 24 and 25. The air distribution layer 23 is further provided with a pressure regulating protrusion 21, and a pressure regulating groove 211 is provided in the pressure regulating projection 21. A pressure regulating hole 212 communicating with the air distribution layer 23 is provided in the bottom of the pressure regulating groove 211. An overflow (or relief) valve 22 is configured in the pressure regulating projection 21.

In the structure of this module, a pressure regulating protrusion communicating with the inside of the air distribution layer is provided in the middle of the air distribution layer, and an overflow valve with a pressure stabilizing function is configured in the pressure regulating protrusion, in order to ensure a stable gas pressure in the air distribution layer. When the air pressure in the air distribution layer is greater than a safety threshold, the gas overflows from the overflow valve so that the air pressure is restored to the safety threshold or lower.

In addition, the specific structure of the overflow valve is further disclosed in this embodiment, referring to FIG. 25. The overflow valve 22 includes: an overflow column 221 with a bottom extending into the pressure regulating hole 212, a limit ring 222 provided around the outer wall of the overflow column 221, a second elastic element 223 sleeved on the side wall of the overflow column 221 and located above the limit ring 222, and a top cover 224 sleeved on the top of the overflow column 221 and provided with a through slot in its center. A second sealing ring 225 is sleeved on the side wall of the overflow column 221 under the limit ring 222. Here, the overflow column 221 with a bottom extending into the pressure regulating hole for fixing serves as a support to facilitate mounting of other elements.

The limit ring 222 is arranged around the outer wall of the overflow column 221. The overflow column is divided into a first column section located above the limit ring and a second column section located under the limit ring. The first column section has a side wall around which a second elastic element 223 is wrapped, and a top end wrapped in a top cover 224 provided with a through slot in its inside. A pressure regulating gap is provided between the first column section and the wall of the through slot. The bottom of the through slot is engaged with the top of the second elastic element. A second sealing ring 225 is sleeved on the second column section.

Based on the above-mentioned design, when the air pressure in the air distribution layer does not exceed the threshold, the limit ring on the overflow column is brought into close contact with the second sealing ring under the action of the second elastic element to prevent air release from the overflow valve. When the air pressure in the air distribution layer exceeds the threshold, the airflow enters a first gap between the bottom of the overflow column and the pressure regulating hole and lifts the limit ring so that the first gap communicates with the pressure regulating groove, and then the airflow is discharged to the outside of the air distribution layer through the pressure regulating gap to achieve the purpose of pressure regulation and ensure a stable gas pressure in the air distribution layer.

Furthermore, the solenoid valve-based pump valve module for providing a massage function for a vehicle seat according to this embodiment has the same basic structure as the solenoid valve-based pump valve module for providing a massage function for a vehicle seat according to the foregoing embodiment, therefore the same parts will not be described in detail here.

Figure 8:
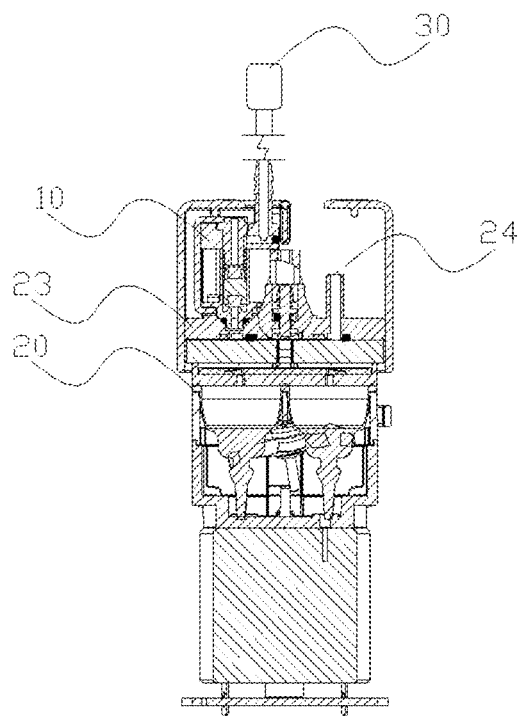
FIG. 8 is a schematic structural diagram of another embodiment of a solenoid valve-based pump valve module for providing a massage function for a vehicle seat according to the present disclosure.

In addition, reference is made to a schematic structural diagram of an embodiment of a solenoid valve-based pump valve module for providing a massage function for a vehicle seat shown in FIG. 8. Specifically, in the solenoid valve-based pump valve module for providing a massage function for a vehicle seat according to this embodiment, at least one air outlet of the air distribution layer 23 is equipped with an air path 24 communicating therewith, which has a hollow tubular structure and has an open free end. In the specific structure of the above-mentioned module, an air path connected to at least one air outlet of the air distribution layer is further designed to be reserved for inflating other components. When it is unnecessary to use the air path, its free end may be blocked.

Optionally, the air path has an inverted L-shaped structure.

Alternatively, the air path has a curved structure and has an unrestricted orientation.

Optionally, a sealing cover is provided at the free end of the air path. When it is unnecessary to use the air path, the air path may be blocked by using the sealing cover or blocked by means of gluing or hot melting.

Reference is made to FIG. 13, which is a schematic structural diagram of an embodiment of a solenoid valve-based pump valve module for providing a massage function for a vehicle seat according to the present disclosure.

FIG. 13 shows an overall appearance view. The structure of the air distribution layer is specifically optimized in this embodiment in such a manner that the air distribution layer 23 is provided with at least four air outlets. At least three of the air outlets are hermetically connected to the solenoid valves 10 in one-to-one correspondence. One of the air outlets is equipped with an air path 24 communicating therewith, and the free end of the air path 24 is provided with a sealing cover.

Figure 14:
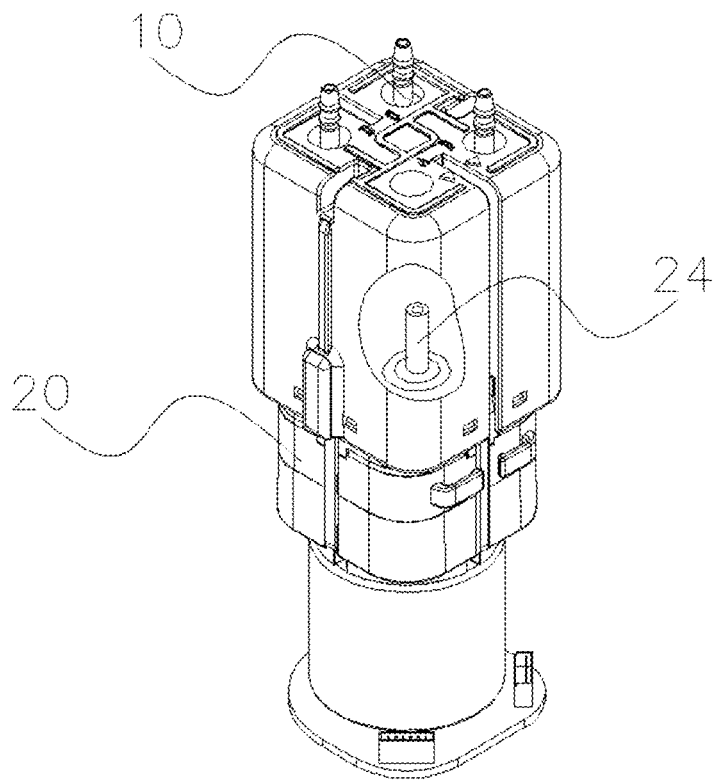
FIG. 14 is a schematic structural diagram of another embodiment of a solenoid valve-based pump valve module for providing a massage function for a vehicle seat according to the present disclosure.

Reference is made to a cross-sectional view shown in FIG. 14, in which the air path is exposed. Specifically, the air distribution layer has four air outlets. Three of the air outlets are hermetically connected to the solenoid valves 10 in one-to-one correspondence. The last air outlet is equipped with an air path 24 communicating therewith, and the free end of the air path 24 are provided with a sealing cover.

The number of the solenoid valves corresponds individually to the number of the inflatable bags. Air can be supplied to different inflatable bags at the same time to achieve a better massage effect.

Figure 26:
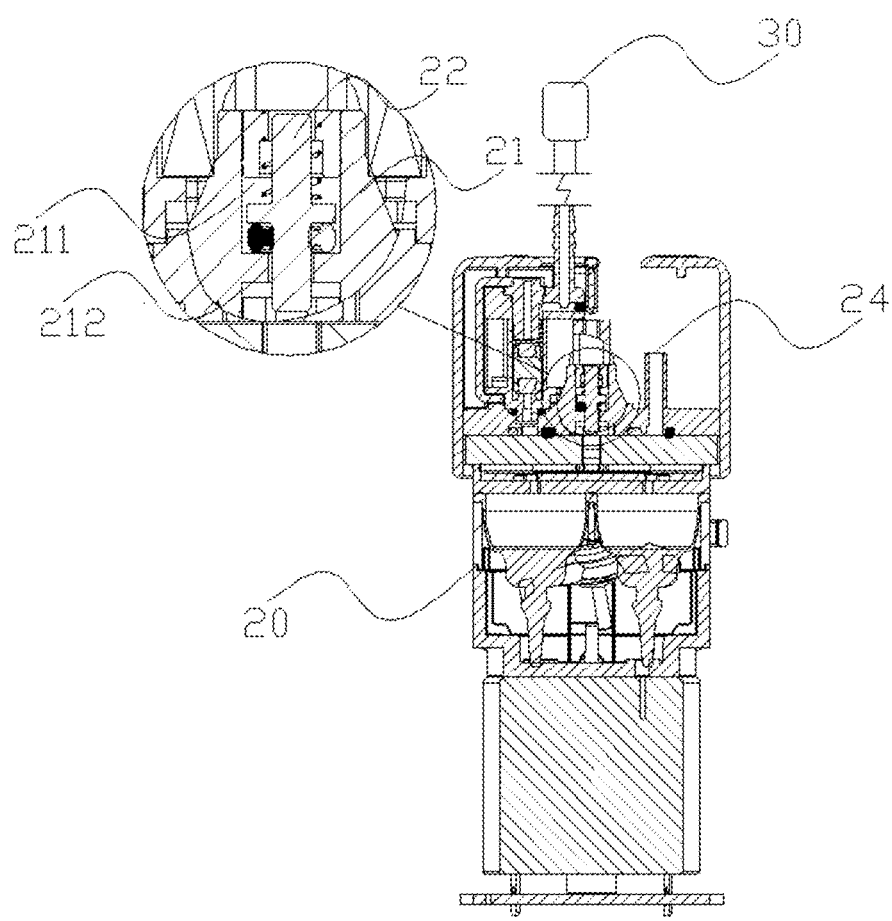
FIG. 26 is a schematic structural diagram of another embodiment of a solenoid valve-based pump valve module for providing a massage function for a vehicle seat according to the present disclosure.

In addition, reference is made to FIG. 26, which is a schematic structural diagram of another embodiment of a solenoid valve-based pump valve module for providing a massage function for a vehicle seat according to the present disclosure.

The air distribution layer 23 is further provided with a pressure regulating protrusion 21, and a pressure regulating groove 211 is provided in the pressure regulating projection 21. A pressure regulating hole 212 communicating with the air distribution layer 23 is provided in the bottom of the pressure regulating groove 211. An overflow (or relief) valve 22 is configured in the pressure regulating projection 21.

In the structure of this module, a pressure regulating protrusion communicating with the inside of the air distribution layer is provided in the middle of the air distribution layer, and an overflow valve with a pressure stabilizing function is configured in the pressure regulating protrusion, in order to ensure a stable gas pressure in the air distribution layer. When the air pressure in the air distribution layer is greater than a safety threshold, the gas overflows from the overflow valve so that the air pressure is restored to the safety threshold or lower.

This embodiment further provides a specific structure of a vehicle seat, which includes the solenoid valve-based pump valve module for providing a massage function for a vehicle seat according to any of the foregoing embodiments.

The solenoid valve-based pump valve module for providing a massage function for a vehicle seat according to this embodiment is applicable to a vehicle seat, so that the vehicle seat has a more compact internal space structure so as to form an optimized internal structural layout.

The above description is merely illustrative of preferred embodiments of the present disclosure and illustrative of the utilized technical principles. It should be understood by those skilled in the art that the scope of the invention involved in the present disclosure is not limited to the technical solutions formed by specific combinations of the foregoing technical features, and should also encompass other technical solutions formed by any combinations of the foregoing technical features or their equivalents without departing from the inventive concept, e.g., technical solutions formed by replacing the foregoing features with the technical features having similar functions disclosed in (but not limited to) the present disclosure or vice versa.

INDUSTRIAL APPLICABILITY

The present disclosure provides a pump valve module and a method for operating the same, a solenoid valve-based pump valve module for providing a massage function for a vehicle seat, and a vehicle seat. The solenoid valve module enables different control of multiple inflatable bags with one air source. Moreover, an air pressure maintaining function is added to the inflatable bags. The pump valve module has a compact structure, can be easily mounted, has stable functions, and enables the cooperation of multiple units.

What is claimed is:

1. An operating method based on a pump valve module, wherein the pump valve module comprises an air pump and a composite solenoid valve, wherein each air outlet of the air pump is equipped with one composite solenoid valve;
   the composite solenoid valve comprises a deflation solenoid valve and an inflation solenoid valve connected in series and formed integrally by injection molding; a first part region of the inflation solenoid valve is connected to an air outlet of an air source; a second part region of the deflation solenoid valve is connected to an inflated bag; a second part region of the inflation solenoid valve is connected to a first part region of the deflation solenoid valve; inflation is implemented when the inflation solenoid valve is powered on and the deflation solenoid valve is de-energized; and deflation is implemented through a third part region of the deflation solenoid valve when the inflation solenoid valve is de-energized and the deflation solenoid valve is powered on; and
   the first part region of the inflation solenoid valve communicates with air outlets of the air pump; at least one composite solenoid valve is provided and is mounted integratedly in a housing formed integrally with the air pump;
   the operating method comprises following working states:
   a first working condition, wherein the inflation solenoid valve is powered on, the deflation solenoid valve is de-energized, the inflation solenoid valve is energized, and a metal valve core is moved down, so that a gas enters the inflation solenoid valve from the air source through a connecting channel, enters the first part region of the deflation solenoid valve from the second part region of the inflation solenoid valve through a channel in an injection-molded core, and enters the inflated bag from the second part region of the deflation solenoid valve;
   a second working condition, wherein the inflation solenoid valve is de-energized, the deflation solenoid valve is powered on, the deflation solenoid valve is energized, a metal valve core is moved upward, and the connecting channel is closed, so that the gas enters the deflation solenoid valve from the inflated bag and is discharged from the third part region of the deflation solenoid valve via the second part region of the deflation solenoid valve; and
   a third working condition, wherein the inflation solenoid valve is de-energized, the deflation solenoid valve is de-energized, and the deflation solenoid valve is closed and configured to maintain air pressure in the inflated bag.

2. The operating method based on a pump valve module according to claim 1, wherein the second part region of the inflation solenoid valve is located at a structural connecting portion in a middle of the composite solenoid valve and is connected, through an injection-molded core, to and staggered axially with respect to the first part region of the deflation solenoid valve; a three-way port is provided in the injection-molded core; the three-way port has an end connected to the second part region of the inflation solenoid valve, an end connected to the first part region of the deflation solenoid valve, and the other end sealed by a sealing ball.

3. The operating method based on a pump valve module according to claim 2, wherein an air outlet nozzle is mounted in the third part region of the deflation solenoid valve, and a side wall of the air outlet nozzle is connected to a side wall of the injection-molded core via a U-shaped iron.

4. The operating method based on a pump valve module according to claim 2, wherein a metal valve core of the inflation solenoid valve and/or the deflation solenoid valve is of one of a flat type and a spline type.

5. The operating method based on a pump valve module according to claim 2, wherein the inflation solenoid valve is a two-position two-way solenoid valve or a two-position three-way solenoid valve, and the deflation solenoid valve is a two-position three-way solenoid valve.

6. The operating method based on a pump valve module according to claim 2, wherein an air inlet nozzle is mounted in the first part region of the inflation solenoid valve, and the air inlet nozzle is connected to a side wall of the injection-molded core via a U-shaped iron.

7. The operating method based on a pump valve module according to claim 2, further comprising a pressure sensor, wherein the pressure sensor is mounted in an air path of the pump valve module or mounted inside the composite solenoid valve.

8. The operating method based on a pump valve module according to claim 1, wherein the inflation solenoid valve is a two-position two-way solenoid valve or a two-position three-way solenoid valve, and the deflation solenoid valve is a two-position three-way solenoid valve.

9. The operating method based on a pump valve module according to claim 1, wherein an air inlet nozzle is mounted in the first part region of the inflation solenoid valve, and the air inlet nozzle is connected to a side wall of the injection-molded core via a U-shaped iron.

10. The operating method based on a pump valve module according to claim 1, further comprising a pressure sensor, wherein the pressure sensor is mounted in an air path of the pump valve module or mounted inside the composite solenoid valve.

* * * * *